March 17, 1959  J. W. STEINDL  2,877,964
HELICOPTER-AIRPLANE
Filed Nov. 15, 1954  2 Sheets-Sheet 1

INVENTOR.
John W. Steindl
By Arthur H. Sturges
attorney

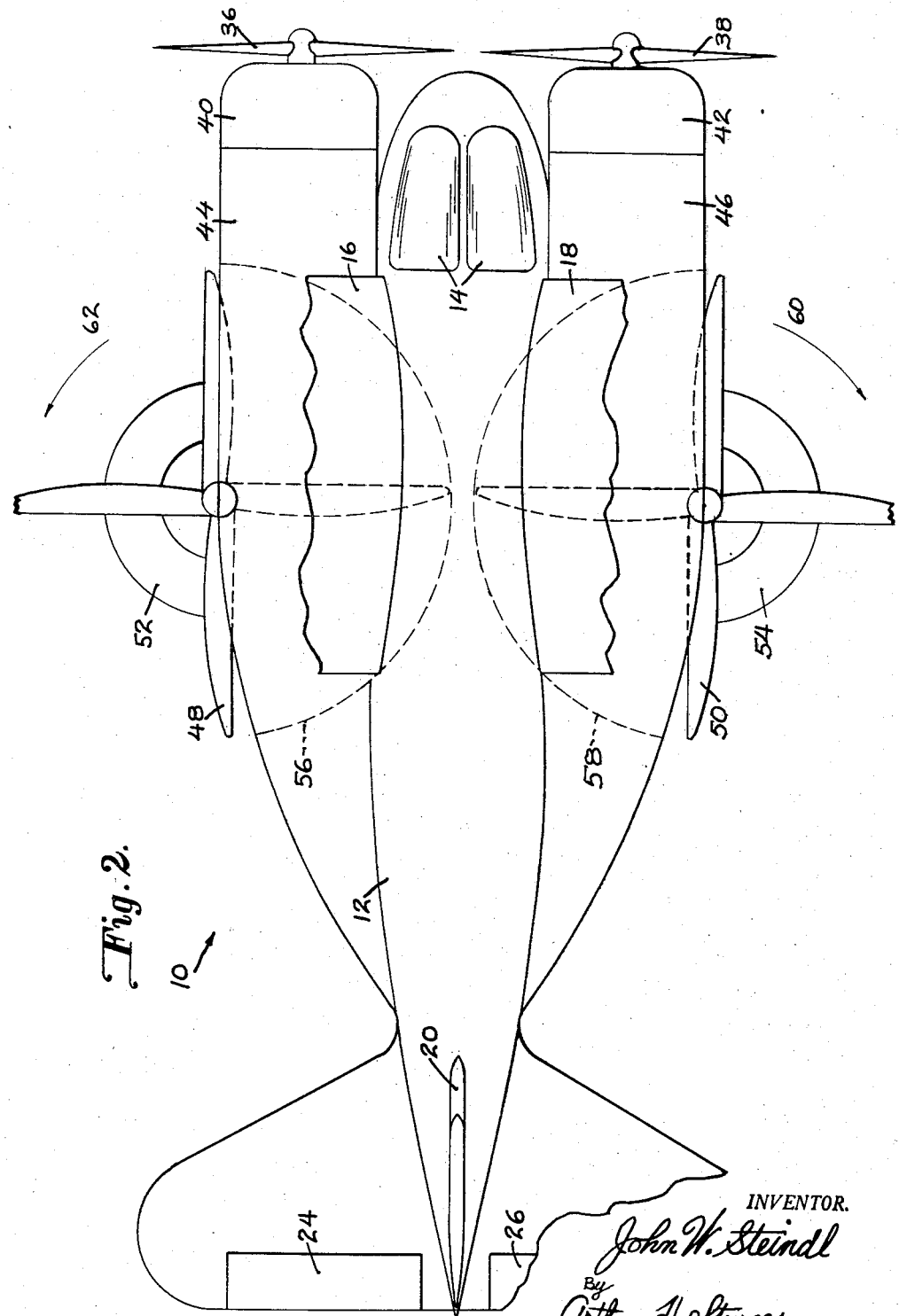

United States Patent Office 2,877,964
Patented Mar. 17, 1959

2,877,964

HELICOPTER-AIRPLANE

John W. Steindl, Omaha, Nebr.

Application November 15, 1954, Serial No. 468,785

1 Claim. (Cl. 244—6)

This invention relates to aircraft of the combination airplane and helicopter type, wherein both vertical and horizontal propulsion is provided, and in particular an aircraft having conventional engines and propellers at the forward end with a cockpit between the engines, and with a pair of independently driven helicopter propellers mounted in a horizontal plane and positioned with parts thereof extended into pockets in a fuselage or nacelle whereby the horizontally disposed propellers are in the prop wash of the conventional vertically disposed propellers and the lifting force is consequently increased.

The purpose of this invention is to provide improvements in aircraft whereby the aircraft is adapted to take off and land in a comparatively short distance.

The problem of reducing the distance between airports and the centers of cities and particularly business districts thereof is becoming more acute from year to year, and furthermore, the necessity for military aircraft to take off and land in comparatively short distances makes it necessary to develop more aircraft of the helicopter type. With this thought in mind this invention contemplates an aircraft combining both vertical and horizontally disposed propellers in which the horizontally disposed propellers are semi-enclosed in the fuselage whereby the effective areas thereof are directly in the paths of the wash of the vertical propellers so that instead of directing a blast of air downwardly upon the upper surface of an aircraft the horizontally disposed propellers provide an upward thrust and this thrust in combination with the air from the conventional propellers increases the lifting force enabling the aircraft to take off and settle down in a relatively short distance.

The object of this invention is, therefore, to provide means for combining horizontally operating propellers with vertically disposed propellers in an aircraft whereby both vertical and horizontal thrust is increased.

Another object of the invention is to provide a helicopter which, in positioning horizontally disposed propellers in the wash of vertically disposed propellers, is capable of attaining very high altitudes.

Another important object of the invention is to provide an aircraft in which horizontally disposed propellers are combined with vertically disposed propellers in such a manner that upon failure of the vertically disposed propellers the aircraft may be brought down safely with the horizontally disposed propellers, and upon failure of the horizontally disposed propellers the aircraft may be brought down safely with the vertically disposed propellers.

A further object of the invention is to provide means for incorporating horizontally disposed propellers in an aircraft in which the horizontally disposed propellers are in the wash of vertically positioned propellers and in which the pressure bearing downwardly on the surface of the aircraft resulting from a propeller positioned above the fuselage is eliminated.

A still further object of the invention is to provide an aircraft in which vertically disposed and horizontally positioned propellers are combined in which the aircraft is of a comparatively simple and economical construction.

With these and other objects and advantages in view the invention embodies an aircraft having a nacelle or fuselage with spaced engines having vertically positioned propellers on shafts thereof at the forward end with a cockpit positioned between the engines, and with spaced vertically disposed engines having horizontally positioned propellers on shafts thereof in the lower part of the fuselage and with the propellers extended into pockets in the sides of the fuselage, the fuselage being provided with conventional wings, landing gear, rudders and elevators.

Other features and advantages of the invention will appear from the following description taken in connection with the drawings, wherein:

Figure 2 is a plan view of the improved combination airplane and helicopter with parts of the wings broken away to show the horizontally positioned propellers, and also with tips of the propellers and part of the tail also broken away.

Figure 1:
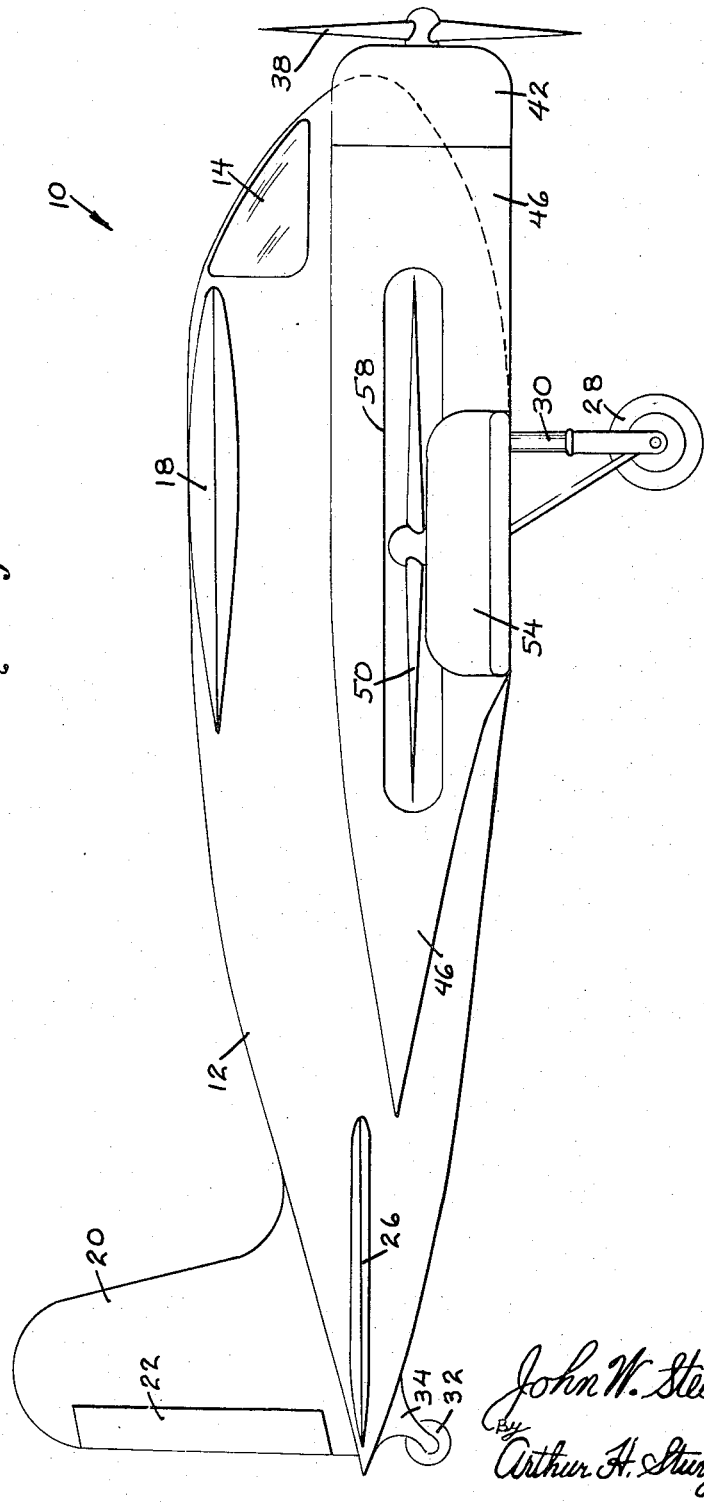
Figure 1 is a side elevational view of the improved aircraft showing the relative positions of the propellers and showing the landing gear in the extended position.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification the same reference characters are used to designate the same parts and elements throughout, and in which the numeral 10 refers to the invention in its entirety, numeral 12 indicating the fuselage including a cockpit or cabin 14, wings 16 and 18, a tail fin 20 and a rudder 22, elevators 24 and 26, landing gear including wheels 28 carried by folding struts 30, and a tail wheel 32 rotatably mounted in a strut 34, numerals 36 and 38 vertically disposed propellers carried by engines 40 and 42 from which engine nacelles 44 and 46 extend, and numerals 48 and 50 horizontally positioned propellers carried by engines 52 and 54 supported on the lower part of the fuselage, and positioned whereby the propellers extend into semi-circular pockets 56 and 58 extended inwardly from opposite sides of the fuselage.

The construction of the fuselage, nacelles, wings and other parts is conventional, and with conventional propellers carried by conventional engines the aircraft may be started with the four engines operating whereby air from the propellers 36 and 38, not only produces pressure under the wings, but also flows over the propellers 48 and 50 increasing the amount of air thrust downwardly from the horizontally disposed propellers and the reaction of this additional thrust produces a greater lifting force. The propeller 50 rotates in a clockwise direction, as indicated by the arrow 60, and the propeller 48 in a counterclockwise direction, as indicated by the arrow 62, and with these propellers rotating in this manner the torque is balanced whereby with the propellers 36 and 38 stationary the aircraft may be held in the air so that it may settle downwardly with ease should both of the engines of the vertically disposed propellers fail. The aircraft is also designed so that should both of the engines of the horizontally disposed propellers fail the vertically disposed propellers may be used to bring the aircraft down in the conventional manner.

With the aircraft including the double nacelle and having a propeller on each section thereof, and with the propellers positioned in a horizontal plane mounted with one-half thereof extended into the fuselage the said propellers in the horizontal plane are in the wash of the propellers in the vertical plane and the best possible efficiency is obtained.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to, in actual practice, if desired.

Having now described the invention that which is claimed to be new and desired to be procured by Letters Patent, is:

In an aircraft, the combination which comprises a fuselage having a cockpit in the forward end and with nacelles spaced laterally from the cockpit and positioned on opposite sides thereof, engines having horizontally disposed shafts in each of said nacelles, propellers positioned in vertical planes carried by the forward ends of the engine shafts, transversely disposed wings extended laterally from the upper part of the fuselage and positioned rearwardly of the cockpit, engines having vertically disposed shafts mounted on the sides of the nacelles with axes of the shafts positioned substantially on the side surfaces of the nacelles, propellers positioned in horizontal planes carried by upper ends of the vertically disposed shafts, the sweep of the propellers in the horizontal planes being extended into the nacelles and fuselage and the nacelles and fuselage being provided with substantially semi-circular pockets for receiving inner portions of the propellers whereby outer portions, only, of said propellers are exposed, landing gear depending from the aircraft, a rudder carried by the tail of the fuselage, and elevators positioned on the sides of the tail.

References Cited in the file of this patent

UNITED STATES PATENTS

| | | |
|---|---|---|
| 1,130,623 | Mustonen | Mar. 2, 1915 |
| 1,754,571 | Podolsky | Apr. 15, 1930 |
| 1,766,844 | Springer | June 24, 1930 |
| 1,784,027 | Piggott | Dec. 9, 1930 |
| 1,787,325 | Rubin | Dec. 30, 1930 |
| 1,799,777 | Burnelli | Apr. 7, 1931 |
| 2,308,477 | James | Jan. 12, 1943 |
| 2,579,055 | Thompson | Dec. 18, 1951 |